Inventor:
Malcolm S. Johnson
By George Heidman
Atty.

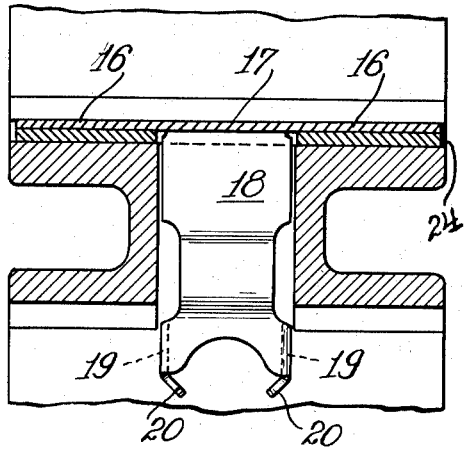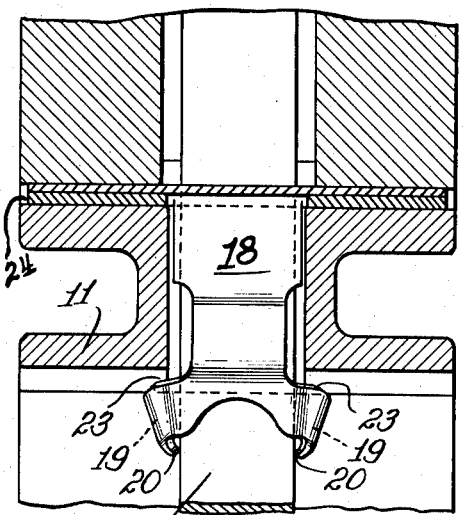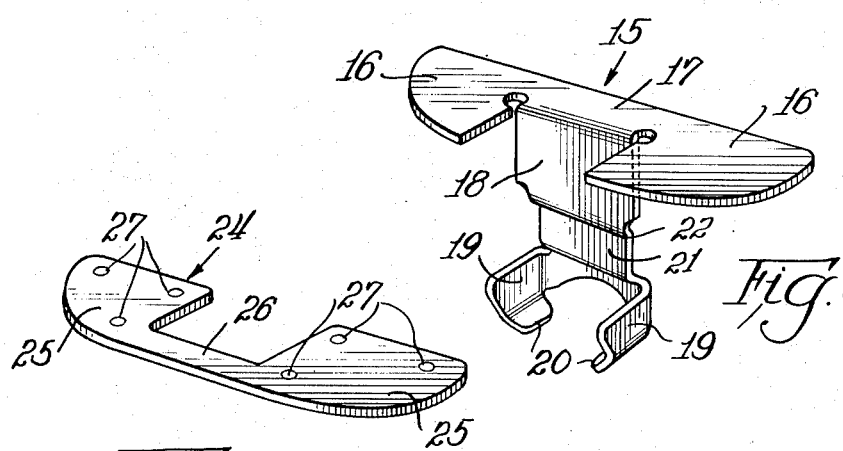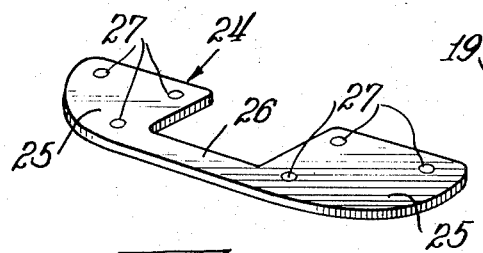

Patented Feb. 3, 1953

2,627,326

UNITED STATES PATENT OFFICE 2,627,326

BRAKEHEAD WEAR PLATE RETAINER

Malcolm S. Johnson, Chicago, Ill., assignor to Illinois Railway Equipment Company, Chicago, Ill., a corporation of Illinois Application December 29, 1950, Serial No. 203,418

5 Claims. (Cl. 188—243)

My improved device is designed for insertion between the brake shoe lug and the shoe supporting lug of the brake head to take the wear resulting from the chattering or relative vibratory movement between the brake shoe and the brake head and which will automatically lock itself to the brake head lug during insertion of the brake shoe locking key.

The invention has for its object the provision of a device that may be easily applied to the brake head shoe supporting lug without need of special tools and which will not readily become misplaced during brake shoe renewal operations.

The construction and operation of my improved wear plate retainer will be readily comprehended from the accompanying drawings wherein:

Figure 3 is a cross-sectional view of the brake head shoe supporting lug with my improved wear plate retainer inserted in place before application of a brake shoe and its locking key.

Figure 4 is a similar view of the brake head and a portion of the brake shoe, with a portion of the locking key shown in place and my improved wear plate retainer in its locking position.

Figure 5 is a perspective view of my improved retainer.

Figure 6 is a perspective view of an auxiliary wear plate which preferably is integrally applied to the plate-like portion of my improved retainer.

Figure 1:
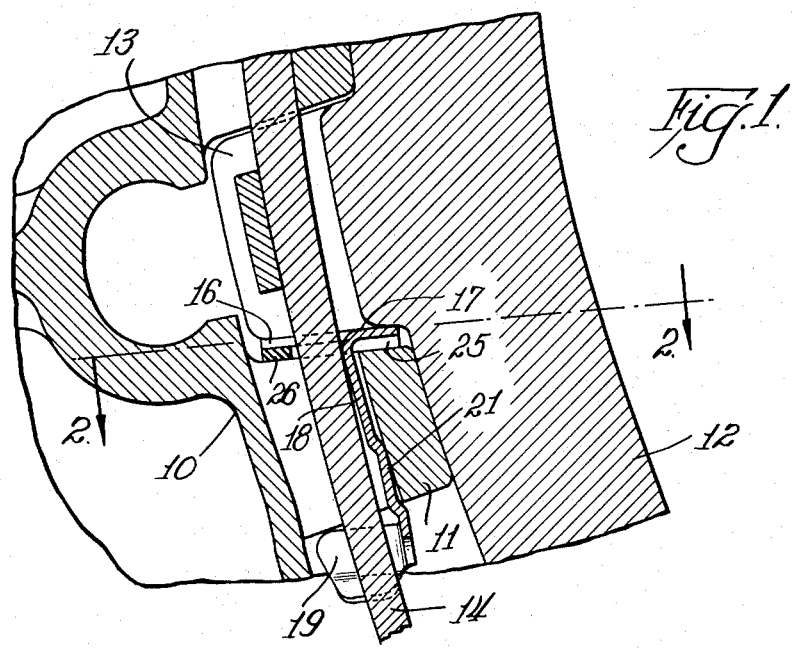
Figure 1 is a sectional view of the intermediate or interengaging lug portions of a brake head and brake shoe in assembled relation and with my improved wear plate retainer applied and also shown in section.

My improved retainer is especially intended for the standard type of brake heads and shoes at present in use without necessitating alterations in construction and which will be self-locking against accidental removal during shoe renewal operations.

In the particular exemplification, merely portions of a brake head, a brake shoe and a shoe locking key are shown; the brake head portion being indicated at 10 provided with the usual shoe supporting lug 11 with the vertical key receiving slot therethrough; the shoe 12 and its rearwardly disposed lug 13 resting on the head lug 11 and also provided with the usual vertical slot which is adapted to register with the vertical slot in the head lug, for reception of the locking key 14 which is driven through from the top.

Due to excessive play or vibrations between the brake head and shoe, especially during brake applications, the brake head shoe supporting lug is subjected to considerable wear, thereby producing greater wear and shortening the useful life of the brake head. It is in an effort to eliminate such condition that my improved wear plate retainer has been devised to fit onto the upper surface of the supporting lug 11 of the brake head.

The retainer 15, shown in Figure 5, consists of hard sheet metal stamped out to provide a plate-like portion consisting of two lobes 16—16 of similar configuration, preferably having arcuate rear and side edges with the lobes united with each other at the forward edge of the device by the intermediate strip portion 17. The retainer 15 is placed on the upper face of the brake head lug 11 with its straight edge disposed forwardly—namely, toward the shoe 12—thus completely covering the forward end of the lug 11 where the greatest wear occurs.

The rear edge of the strip portion 17 is provided with an integral leg 18 of width less than the length of the key slot in the head supporting lug 11 of the brake head. The leg 18 is adapted to fit into the key slot of the head lug and its over-all length is somewhat greater than the thickness of the head lug to permit the lower end to extend beneath the lug and the extended lower end is formed into the rearwardly projecting laterally spaced toes 19—19, which at the bottom have the angularly and inwardly disposed flanges or tips 20—20, which extend into the path of the shoe locking key 14 while the vertically disposed body portions of the toes 19 normally extend parallel with the vertical sides of the slot or keyway in the head lug 11 before application of the shoe locking key 14, as shown in Figure 3, and are so constructed that they are easily passed through the keyway and also permit entrance of the brake shoe key. The leg 18 adjacent the toes 19—19 is shown of slightly less width at 21 (see Figure 5) than the upper part of the leg and is offset forwardly at 22 so as to engage the forward face of the key slot in the head lug 11, thereby producing a spring-like tightening effect by the upper part of the leg on the key 14 and holding the latter in place by forcing the upper end of the leg 18 into firm frictional engagement with the key. The off-set section 21 also replaces any metal that is worn off the forward wall of the keyway in lug 11 as a result of the brake shoe key movement.

When the locking key is introduced, it forces the flanges or tips 20—20 apart and by reason of their angular disposition, the spreading force produced by the key is transmitted to the junction between the toes 19—19 and the leg section 21, causing the toes to slightly revolve or turn about their axes—thereby spreading the toes into the shoulder-like portions 23 and into engaging position beneath the brake head lug 11 as shown in Figures 1 and 4.

This condition or tendency is accomplished by having the tips or flanges 20 comparatively short and at an obtuse angle so that the force required to straighten them is proportionately greater than the force required to bend the material about axes disposed through the junctures between the toes 19 and the leg section 21.

The rearward forcing of the key 14, in addition to bindingly holding the latter against upward creeping movement, also causes the shoe through the action of key 14 to be forced slightly rearward, thereby holding the rear face of the shoe in firm relation with the brake head lugs and preventing chattering or vibratory movement between the brake head and brake shoe.

The retainer 15 preferably is provided with a wear take-up blank 24 of sheet metal stamped to the configuration of the upper plate-like portion 16, 16 of the retainer and providing the flat portions 25, 25 which match the lobes 16, 16 of the retainer 15. The portions 25, 25 are connected by the connecting strip 26; the wear plate 24 preferably is secured to the lower side of the lobes 16, 16 of the retainer 15, with the connecting strip 26 arranged at the rear or head side of the key slot—see Figures 1 and 2—thereby also reenforcing the rear side of the retainer as well. The wear plate 24, which may be of any desired thickness to compensate for variations in brake head lug wear, in practice is generally secured to the flat lobes or flat plate-like portions 16, 16 by spot welding, as indicated at 27 in Figure 6.

Figure 2:
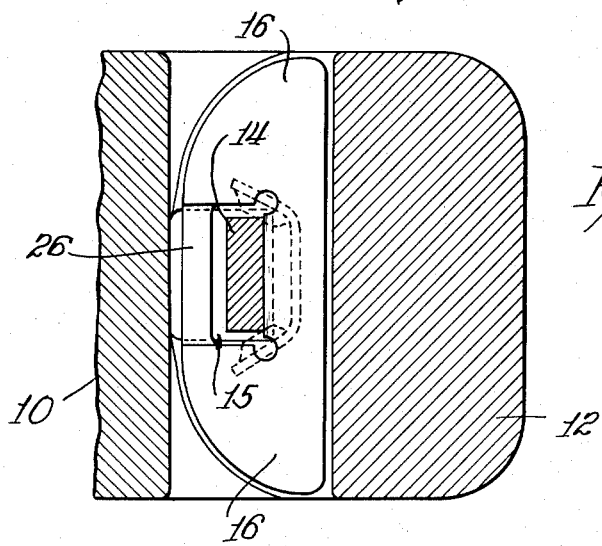
Figure 2 is a cross-sectional view taken on the line 2—2 of Figure 1 as viewed by the arrows.

As is apparent, the toes 19, 19 will be slightly spread and twisted into the position shown in Figures 2 and 4 so as to present the shoulders 23, 23 beneath the head lug 11 thereby holding the retainer and wear plate in place against displacement when occasion necessitates withdrawal of the key 14 in order to replace the shoe. With the upper part of the leg 18 bearing against the forward side of the key and the off-set portion 21 bearing against the forward wall of the key slot in the head lug, the key with the shoe is forced rearwardly, so that the retainer also acts as a shoe tightener against undesirable chatter.

The exemplification shown and described is believed to be the best adaptation of my invention, but certain deviations may be possible without, however, departing from the spirit of my invention as defined in the appended claims.

What I claim is:

1. A brake head wear plate retainer, in combination with a brake head provided with a shoe supporting slotted lug, a brake shoe with a slotted lug which rests on the head lug and an elongated locking key which passes through the slots of the head and shoe lugs, a wear element arranged to be placed on the upper surface of the shoe supporting lug of the brake head and comprising a pair of flat plate-like spaced portions united adjacent a longitudinal edge by a strip portion whose inner longitudinal edge is provided with a downwardly disposed leg of predetermined width and length and arranged to extend through the slot in the brake head lug parallel with the brake shoe locking key, the lower end of said leg being provided with rearwardly disposed laterally spaced portions normally extending substantially parallel with the side edges of said leg and having inwardly disposed lower tip portions arranged to extend into the path of the shoe locking key and to be spread thereby into locking engagement with the bottom of the head lug.

2. In combination with the shoe supporting lug of a brake head, a shoe with a slotted lug resting on the head lug and an elongated key passing through the slots of the lugs for locking the shoe to the head, a brake head wear plate retainer member arranged on the upper face of the shoe supporting lug of the brake head and provided with a locking key passage, composed of a pair of spaced flat portions arranged on the head lug at opposite sides of the key receiving slot and connected at their forward margins by a flat strip portion whose rear longitudinal edge is provided with a downwardly disposed flat sided leg of predetermined width and length to extend through the slot in the brake head lug and parallel with the shoe locking key, the lower end of the leg being off-set forwardly to engage the inner wall of the key slot in the head lug, while the lower end of said off-set portion terminates in laterally spaced vertically disposed toes extending slightly beyond the vertical edges of said off-set portion and having inwardly disposed lips arranged to extend into the path of the shoe locking key whereby the toes are caused to spread beneath the head lug when the shoe locking key is driven into place.

3. In combination with a brake head having a slotted shoe supporting lug, a brake shoe with a slotted lug supported by the head lug and an elongated shoe locking key which passes through the slots of both lugs; a brake head wear plate retainer of sheet metal arranged on the upper face of the shoe supporting brake head lug, provided with a shoe locking key receiving passage therethrough, composed of a pair of spaced flat portions arranged on the head lug at opposite sides of the key slot and connected adjacent the front edge by a flat strip having an integral downwardly disposed leg extending entirely through said head lug and formed at the lower end of the leg at opposite edges with a pair of laterally spaced vertical walls provided at bottom with inwardly disposed lips arranged to be engaged by the shoe locking key whereby said vertical walls are caused to twist and spread outwardly beyond the vertical planes of the side edges of the leg, into holding engagement with the bottom of said head lug.

4. A brake head wear plate retainer for the shoe supporting slotted lug of a brake head and composed of a pair of spaced flat faced portions with a passage therebetween and connected adjacent their forward edges by a flat strip portion having an integral downwardly disposed flat-sided leg with a forwardly off-set portion, said leg having laterally off-set and spaced twistable toes with inwardly disposed opposing portions extending into the vertical plane of said passage between the flat faced portions.

5. A brake head wear plate retainer for the shoe supporting slotted lug of a brake head adapted to fit onto the upper surface of the shoe supporting lug and composed of a pair of spaced flat portions connected adjacent their forward edges by a flat strip having an integral downwardly disposed leg terminating in laterally offset and spaced toes having vertical walls and opposingly extending tips; and a flat wear plate matching the pair of spaced flat portions and having a connecting strip adjacent the rearward edges, said wear plate being intimately secured to said flat portions of the retainer.

MALCOLM S. JOHNSON.

REFERENCES CITED

The following references are of record in the file of this patent:

UNITED STATES PATENTS

| Number | Name | Date |
|---|---|---|
| 2,088,126 | Wright | July 27, 1937 |
| 2,110,574 | Harbert | Mar. 8, 1938 |
| 2,283,637 | Johnson | May 19, 1942 |
| 2,377,371 | Prentice | June 5, 1945 |
| 2,377,372 | Prentice | June 5, 1945 |